United States Patent
Schwab et al.

(10) Patent No.: US 12,530,803 B1
(45) Date of Patent: Jan. 20, 2026

(54) SYSTEM AND METHOD FOR IDENTIFICATION OF COLORS IN DIGITAL IMAGES

(71) Applicant: UrynX, LLC, East Chatham, NY (US)

(72) Inventors: Brian Schwab, East Chatham, NY (US); Alexander Paul Karpowicz, Los Alamos, NM (US); Edward Martin Kohler, Caldwell, NJ (US)

(73) Assignee: UrynX LLC, East Chatham, NY (US)

( * ) Notice: Subject to any disclaimer, the term of this patent is extended or adjusted under 35 U.S.C. 154(b) by 0 days.

(21) Appl. No.: 19/087,530

(22) Filed: Mar. 23, 2025

Related U.S. Application Data

(60) Provisional application No. 63/696,653, filed on Sep. 19, 2024.

(51) Int. Cl.
| | |
|---|---|
| *G06K 9/64* | (2006.01) |
| *G01N 21/78* | (2006.01) |
| *G06T 3/40* | (2006.01) |
| *G06T 7/90* | (2017.01) |
| *G01N 21/77* | (2006.01) |

(52) U.S. Cl.
CPC ............. *G06T 7/90* (2017.01); *G01N 21/78* (2013.01); *G06T 3/40* (2013.01); *G01N 2021/7759* (2013.01); *G06T 2207/10024* (2013.01); *G06T 2207/20081* (2013.01); *G06T 2207/30004* (2013.01)

(58) Field of Classification Search
CPC ... G06T 7/90; G06T 3/40; G06T 2207/10024; G06T 2207/20081; G06T 2207/30004; G01N 21/78; G01N 2021/7759; G06N 7/023; G06N 20/00; A61B 10/007; A61B 2505/07; A61B 2560/04; A61B 10/0045; A61M 39/00; A61M 39/10; A61M 39/20
See application file for complete search history.

(56) References Cited

U.S. PATENT DOCUMENTS

| | | | |
|---|---|---|---|
| 11,253,235 B1 * | 2/2022 | Schwab | A61B 10/007 |
| 2016/0274104 A1 * | 9/2016 | Aminoff | G01N 21/8483 |
| 2018/0136140 A1 * | 5/2018 | Brendsel | G06T 7/0012 |

* cited by examiner

*Primary Examiner* — Duy M Dang
(74) *Attorney, Agent, or Firm* — Michael D. Eisenberg; MDE Patents

(57) ABSTRACT

An aspect of some embodiments of the present invention relates to a method for comparing a color of a colored region to a plurality of predetermined discrete colors, the method comprising: a) identifying, on a digital image, a colored region; b) determining a color of the colored region, and determining a set of first values of color components forming the color, the color components belonging to a predetermined color space; c) receiving parameters from a machine learning system trained to identify a plurality of color groups based on training data, and each color group corresponding to a respective discrete color of a plurality of predetermined discrete colors, the parameters being indicative of the color groups; d) processing the first values with at least some of the parameters in order to associate the color of the colored region with one of the predetermined discrete colors.

18 Claims, 14 Drawing Sheets

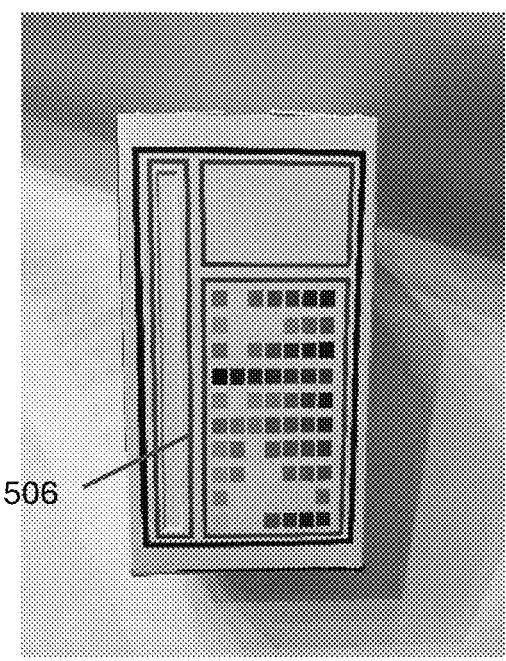
Fig. 18
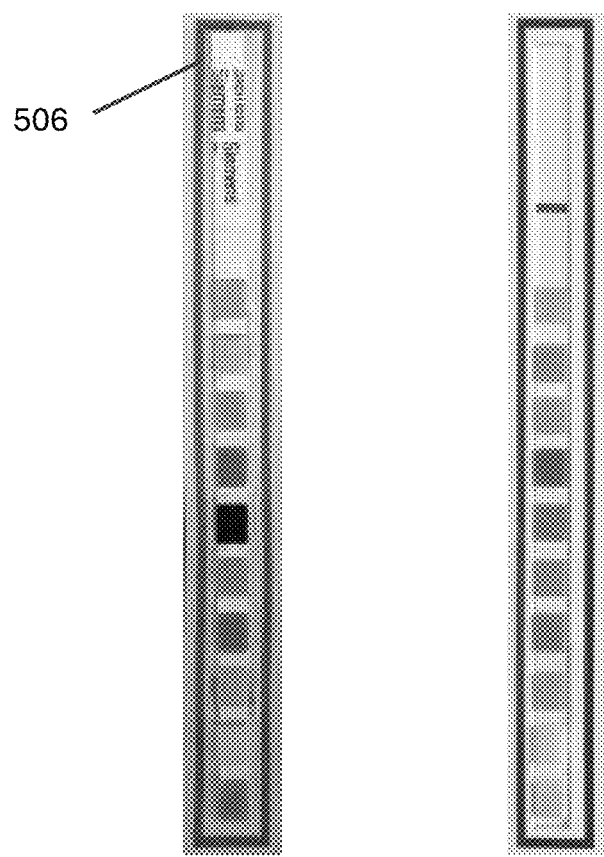
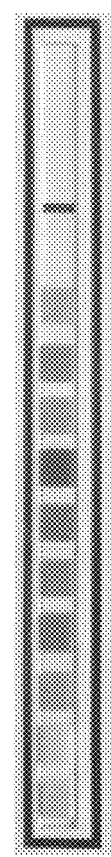
Fig. 19  Fig. 20

SYSTEM AND METHOD FOR IDENTIFICATION OF COLORS IN DIGITAL IMAGES

CROSS-REFERENCES TO RELATED APPLICATIONS

The present application claims priority to U.S. Provisional Application Ser. No. 63/696,653 filed on Sep. 19, 2024, which is hereby incorporated in its entirety.

TECHNICAL FIELD

This invention relates to image analysis, and more specifically to identification of colors in digital images.

BACKGROUND OF THE INVENTION

Urinalysis strips (also known as urine test strips or "dipsticks") allow for the rapid measurement of numerous urine parameters and substances. The strip includes a plurality of reagent pads. Each reagent pad has a material that reacts with a substance in the urine and changes color upon contact with urine, depending on the presence and quantity of the substance in the urine. The color changes on the reagent pads are read after a defined period of time, either by eye by a medical professional or using an automated instrument present in a medical lab.

Medical professionals or automated lab instruments for reading the strip are not readily available at all times and all places. There is currently no way to provide accurate analysis of a digital image of the strip for providing results to a doctor from a home-based urinalysis test strip.

BRIEF SUMMARY OF EMBODIMENTS OF THE INVENTION

An aspect of some embodiments of the present invention relates to a method for comparing a color of a colored region to a plurality of predetermined discrete colors, the method comprising: a) identifying, on a digital image, a colored region; b) determining a color of the colored region, and determining a set of first values of color components forming the color, the color components belonging to a predetermined color space; c) receiving parameters from a machine learning system trained to identify a plurality of color groups based on training data, and each color group corresponding to a respective discrete color of a plurality of predetermined discrete colors, the parameters being indicative of the color groups; d) processing the first values with at least some of the parameters in order to associate the color of the colored region with one of the predetermined discrete colors.

In a variant, the step (b) of determining a color of the colored region comprises: providing a plurality of positions in the colored region; determining, for each position of the plurality of positions, a respective set of second values of the color components belonging to the predetermined color space; averaging the second values of each color component of the plurality of positions, to yield a set of average values of the color components, the set of average values of the color components being the set of first values of color components of the color of the colored region.

In another variant, the step (a) of providing, on a digital image, a colored region comprises: providing a location pixel indicative of a location of the colored region.

In a further variant, the step (b) of determining a color of the colored region comprises: providing a plurality of positions within a predetermined distance from the location pixel; determining, for each position in the plurality of positions, a respective set of second values of the color components belonging to the predetermined color space; averaging the second values of each color component of the plurality of positions, to yield a set of average values of the color components, the set of average values of the color components being the set of first values of color components of the color of the colored region.

In yet a further variant, the method incudes: resizing the digital image to generate a resized image of a predetermined pixel size; determining, for each pixel of the resized image, a color saturation value; finding a peak saturation value among the color saturation values, the peak corresponding to the location of the colored region; setting a location corresponding to the peak saturation value as the location pixel of the colored region.

In a variant, the digital image is provided such that the colored region is substantially symmetrical about a vertical axis, the method comprising: resizing the digital image to generate a resized image of a predetermined pixel size; determining, for each pixel of the resized image, a color saturation value; averaging the color saturation values horizontally, thereby determining a plurality of average horizontal saturation values; finding a peak among the average horizontal saturation values; setting a vertical location of the peak as a vertical coordinate of the location pixel of the colored region; setting a horizontal location of the vertical axis as a horizontal coordinate of the colored region.

In another variant, the predetermined color space is an RGB color space, and the color components are a red color component, a green color component, and a blue color component.

In yet another variant: step (a) comprises: identifying, on the digital image, a plurality of separate colored regions, each colored region being surrounded by a background region; step (b) comprises: for each colored region, determining a respective color of the colored region, and determining a respective set of first values of color components forming the respective color, the color components belonging to the predetermined color space; step (c) comprises: for each colored region, receiving a respective set of parameters from a machine learning system trained to generate a set of color groups, each set of color groups being associated with a respective colored region of the plurality of colored regions, each color group corresponding to a respective discrete color of a respective plurality of predetermined discrete colors associated with the colored region, the parameters in each set of parameters being indicative of the color groups; step (d) comprises: for each colored region, processing the first values with at least some of the parameters indicative of the color groups associated with the colored region, in order to associate the color of the colored region with one the predetermined discrete colors.

In a further variant, the method includes, prior to step (a): placing a test strip having the colored region on a recessed surface surrounded by a line; providing a raw digital image of the test strip in the recessed surface; detecting the line; obtaining the digital image by processing the raw digital image, by keeping from the raw digital image of the test strip in the recessed surface only a section that is within the line surrounding the recessed surface.

In yet a further variant, the method includes, prior to step (a): placing a test strip having the colored region on a surface; tilting the surface with respect to a horizontal plane;

capturing a photograph of the test strip while tilted; processing the photograph to provide the digital image.

In a variant, the method includes, prior to step (a): training the machine learning system to generate the plurality of color groups, by: providing training data in form of a plurality of first digital images having respective first colored regions having respective first colors and providing a known discrete color of the plurality of predetermined discrete colors for each first color; generating training data points for a plurality of colors assumed by the first colored regions by using the first digital images, each training data point corresponding to a point in the predetermined color space; instructing the machine learning system to create a predictive model by identifying clusters of the training data points in the color space, using locations of the points in the color space and the known discrete colors of the training data points, and creating partitions between the clusters; wherein the parameters are parameters of the partitions separating the clusters.

In another variant, each training data point corresponds to a respective first colored region of a respective first digital image, and each training point being determined by: detecting a training value of each of the color components belonging to the predetermined color space in first colored region.

In yet another variant, each training value is calculated by: detecting first-region values of the color components belonging to the predetermined color space at a plurality of spots in the respective first colored region; for each of the color components averaging the first-region values of the spots, thereby generating the training value of each color of the components.

In a further variant, the machine learning system comprises a support vector machine (SVM).

In yet a further variant, the generating of training data points further comprises augmenting the training data by creating one or more pseudo samples, the creating of one of the pseudo samples comprising: providing the discrete colors of the plurality of predetermined discrete colors, and for each of the discrete colors providing a set of predetermined color component values which form the predetermined color in the color space; for each of the predetermined discrete colors, identifying the training data points corresponding to the predetermined discrete color and averaging the training values of each of the color components of the identified training data points, thereby creating a set of averaged training color components, and calculating a standard deviation corresponding to each of the averaged training color components; generating a pseudo training data point for each of the predetermined discrete colors, by adding to each one of the predetermined color component values a random number ranging from a negative value of the standard deviation to a positive value of the standard deviation corresponding to a respective average training color component.

Another aspect of some embodiments of the present invention relates to method for training a machine learning system to generate the plurality of color groups, the method comprising: providing training data in form of a plurality of first digital images having respective first colored regions having respective first colors and providing a known discrete color of the plurality of predetermined discrete colors for each first color; generating training data points for a plurality of colors assumed by the first colored regions by using the first digital images, each training data point corresponding to a point in a predetermined color space; instructing the machine learning system to detect clusters of the training data points and to create partitions between the clusters; outputting parameters of the partitions.

In a variant, each training data point corresponds to a respective first colored region of a respective first digital image, and each training point being determined by: detecting a training value of each of the color components belonging to the predetermined color space in the first colored region.

In another variant, each the training value is calculated by: detecting first-region values of the color components belonging to the predetermined color space at a plurality of spots in the respective first colored region; for each of the color components averaging the first-region values of the spots, thereby generating the training value of each color of the components.

In yet another variant the machine learning system comprises a support vector machine (SVM).

In a further variant the generating of the training data points further comprises augmenting the training data by creating one or more pseudo samples, the creating of one of the pseudo sample comprising: providing the discrete colors of the plurality of predetermined discrete colors, and for each of the discrete colors providing a set of predetermined color component values which form the predetermined color in the color space; for each of the predetermined discrete colors, identifying the training data points corresponding to the predetermined discrete color and averaging the training values of each of the color components of the identified training data points, thereby creating a set of averaged training color components, and calculating a standard deviation corresponding to the averaged training colored components; generating a pseudo training data point for each of the predetermined discrete colors, by adding to each one of the predetermined color component values a random number ranging from a negative value of the standard deviation to a positive value of the standard deviation corresponding to a respective averaged training color component.

Yet another aspect of some embodiments of the present invention relates to a method for analysis of a digital image of one or more reagent pads on a test strip, each of the one or more reagent pads being configured to assume one of a respective plurality of colors upon contacting a liquid, depending on a quantity of a substance in the liquid, the method comprising: a) providing, on a digital image of a test strip, a set of location pixels, each location pixel indicative of a location of a respective one of one or more reagent pads of the test strip; b) determining, for a plurality of positions around the location pixel of each of the one or more reagent pads, values of color components belonging to a predetermined color space; c) for each one of the one or more reagent pads, separately averaging the values of each of the color components at the positions, thereby generating an average input value for each of the color components and generating a color of the pad as a set comprising the average input values; d) for each one of the one or more reagent pads, providing a respective set of parameters from a machine learning system trained to identify a plurality of color groups which correspond to respective diagnoses for a substance reacting with the one of the reagent pad, the parameters being indicative of the color groups; e) for each one of the one or more reagent pads, processing the average input values of the color components of the reagent pad with at least some of the parameters indicative of the color groups associated with the reagent pad, to determine which of the color groups the color of the reagent pad fits into, thereby associating the color of the reagent pad with a diagnosis of the one of color groups corresponding the reagent pad, and outputting a diagnosis relating to the substance reacting with the one of the one or more reagent pads.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 18 is a photograph of the recessed surface of the box of FIG. 16, according to some embodiments of the present invention;

FIG. 19 is a photograph of a test strip taken when the box is not angled, according to some embodiments of the present invention;

FIG. 20 is a photograph of a test strip taken when the box is set up at an angle with the horizontal, according to some embodiments of the present invention.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The systems and methods herein involve artificial intelligence for image analysis. The technique of the present invention may be implemented via a user computing unit, such as a smart phone, computer, or tablet, to provide accurate results pertaining to medical testing, such as, but not limited to, home-based urinalysis tests.

One of the applications of the present invention enables the analysis of a urine test strip by providing a photograph of the test strip to a remotely located processing device which has received parameters from a machine learning system or artificial intelligence that has been trained for analyzing the photograph in order to determine the color of the reagent pads. The parameters are used by the remote processing device to identify the colors of the reagent pads and therefore provide a diagnosis relating to analytes in the urine.

Figure 1:
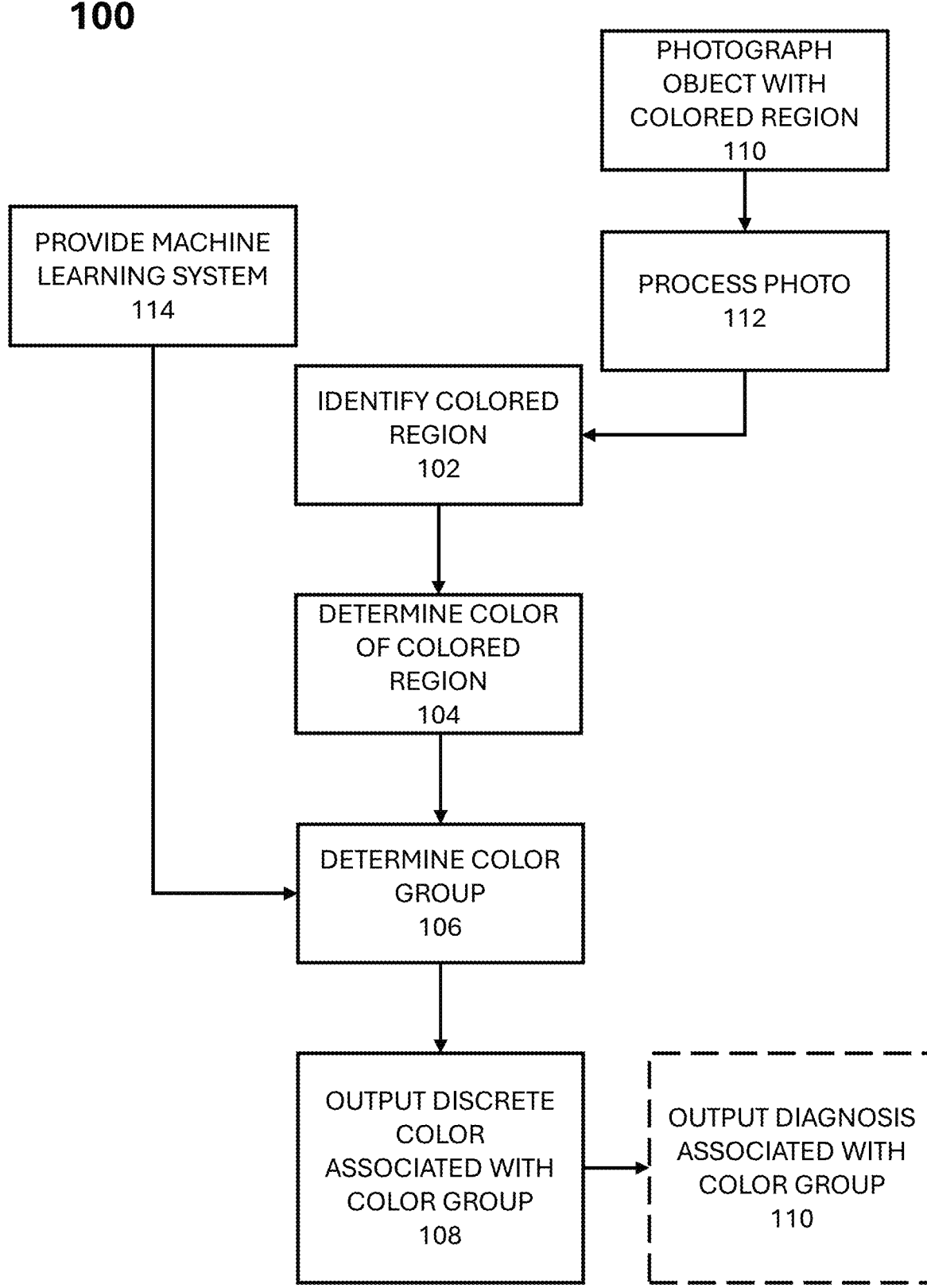
FIG. 1 is a flowchart illustrating a method for determining a color of a colored region and associating the determined color with a predetermined discrete color, according to some embodiments of the present invention.

Referring now to the drawings, FIG. 1 is a flowchart 100 illustrating a method for determining a color of a colored region and associating the determined color with a predetermined discrete color, according to some embodiments of the present invention.

Figures 10, 11:
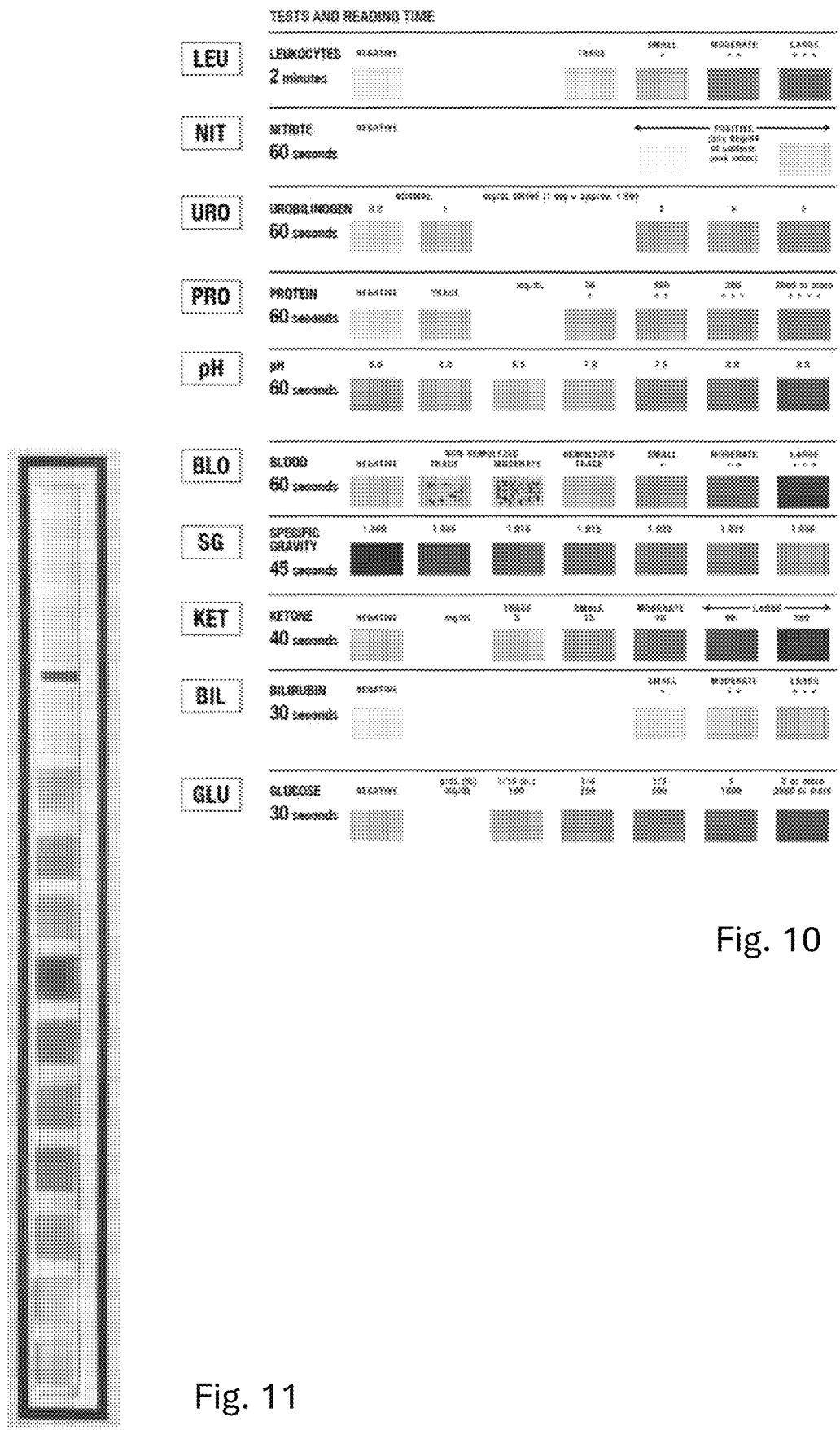
FIG. 10 is an example of a Siemens Analyte Chart that may be used as the source of predetermined discrete colors, according to some embodiments of the present invention.
FIG. 11 illustrate a Siemens test strip that may be analyzed via the technique of the present invention.

At 102, a colored region is identified for analysis in the digital image. In some embodiments of the present invention, the location of the colored region is provided a priori. In other embodiments of the present invention, the colored region is defined by being surrounded by a background region. The identification of the colored region may be based on the difference in color saturation between the colored region and the background region. For example, if the colored region is a reagent pad (which may assume a plurality of colors, depending on the presence and quantity of a substance in a liquid contacting the reagent pad), all of the reagent pad's colors differ from the white background. Therefore, the color saturation in the colored region differs from the color saturation of the white background. An example of a test strip is Siemens test strip used to test urine samples, as seen in FIG. 11. The colors assumed by the reagent pads of the test strip all differ from the white background, as seen in FIG. 10, which shows the Siemens Analyte Chart. It should be noted that the identification of colors in urine test strips is only an example of the applications of the image processing technique of the present invention. Other applications may include drug test strips, blood testing strips, chloride detection strips for use in swimming pools, assemblies used in the textile industry to detect the color of textiles in order to determine whether the right amount of dye was used.

At 104, the color of the colored region is determined. The color of the colored region may be expressed as a vector of values of color components of a predetermined colored model. Non-limiting examples of color spaces may include RGB (Red, Green, Blue), RYB (Red, Yellow, Blue), CMY (Cyan, Magenta, Yellow), CMYK (Cyan, Magenta, Yellow, Black), HSL (Hue, Saturation, Lightness), HSV (Hue, Saturation, Lightness). In the non limiting example of the RGB color space, the color of the colored region is expressed as a vector V=[R, G, B], where R is the value of the red component of the color of the colored region, G is the value of the green component of the color of the colored region, and B is the value of the blue component of the color of the colored region. In the non-limiting examples presented in this document, colors will be expressed as vectors in the RGB color space, and operations will be performed in the RGB color space. However, it should be noted that the scope of the present invention is not limited to RGB color space, and any other color space can be used.

At 106, the color of the colored region determined at 104 is compared to a plurality of color groups determined via a machine learning system. The machine learning system is provided and trained at 114 to identify a plurality of color groups, each color group occupying a respective portion in the predetermined color space, and each color group being associated to a respective discrete color of a plurality of predetermined discrete colors. In other words, the color of the colored region can assume a certain range of colors (for example, a reagent pad may assume a color from a predetermined range of colors). The range of colors is described by a plurality of discrete colors (e.g., the colors of an analyte chart for a specific analyte). The machine learning system is trained to identify a plurality of color groups. Each color group occupies a portion of the color space. These regions are not necessarily exclusive until a transformation is applied to the training data, converting the color space to a space with a higher number of dimensions where the groups are exclusive and separate from each other. Each color group is associated with one of the predetermined discrete colors. In the present invention, a computing device that has received data indicative of the color groups from a machine learning system receives the color of the colored region, and determines which color group to which the color of the colored region belongs. In a non-limiting example, the machine learning system outputs one or more parameters indicative of each color group, and the color of the colored region is processed using the parameters of each group, to yield a figure indicative of whether the color of the colored region belongs to the respective color group. In this manner, the color of the colored region is associated with the discrete color corresponding to the color group inside with the color of the colored region is.

In some embodiments of the present invention, the discrete color associated with the color of the colored region is output, at 108. In the application of test strips, each of the discrete colors of an analyte corresponds to a diagnosis relating to the analyte. Therefore, outputting the discrete color corresponding to the color of the reagent pad (the colored region) enables the provision of a diagnosis of the analyte tested by the reagent pad, as seen in step 110.

In some embodiments of the present invention, prior step 104, a photograph of an object with a colored region is taken at 110, and the photograph is processed 112, in a manner that allows the photograph to be analyzed, as will be explained further below. In some embodiments of the present invention, the photograph is taken when the object is at a non-zero angle with the horizontal, in order decrease lighting effects that may negatively affect the colors of the object in the digital image, as will be discussed below.

Figure 8:
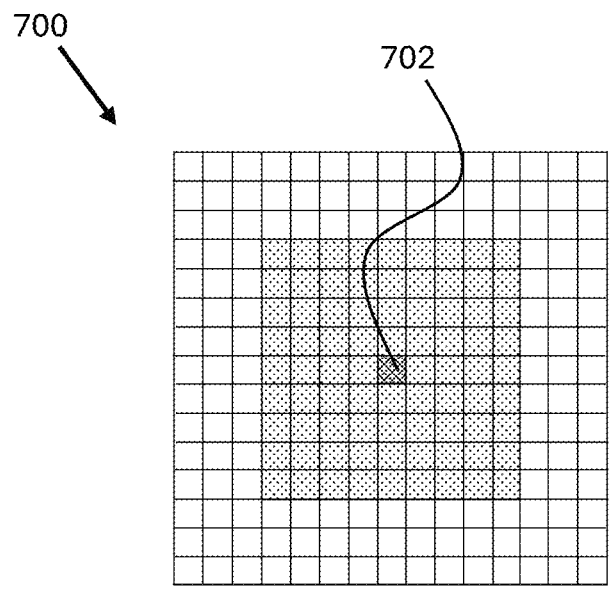
FIG. 8 illustrates a subdivision of a digital image into pixels for finding a location pixel of the colored region, according to some embodiments of the present invention.

Reference is not made to FIG. 8 to illustrate a subdivision of a digital image into pixels for finding a location pixel of the colored region, according to some embodiments of the present invention.

In the example of FIG. 8, the digital image 700 is divided into a plurality of pixels. The color saturation of each pixel is determined via an image processing algorithm. A peak saturation value among the color saturation values is determined and the pixel having the peak saturation value (e.g. pixel 702) is set as the location pixel of the colored region. The inventors have found that in a reagent pad, the location having highest color saturation is generally at or near the middle of the reagent pads. Therefore, determining a peak in saturation generally provides a central location in the reagent pad.

In some embodiments of the present invention, prior to determining the location pixel, the digital image is resized, by correcting the resolution of the image to a uniform image. For a Siemens test strip, the corrected resolution of the image may be, in a non-limiting example, 96×928 pixels. However, the pixel count may be different, and the present invention extends to correcting resolution to any resolution different than 96×928 pixels. Uniformity in the resolution makes edge detection possible.

Figure 9:
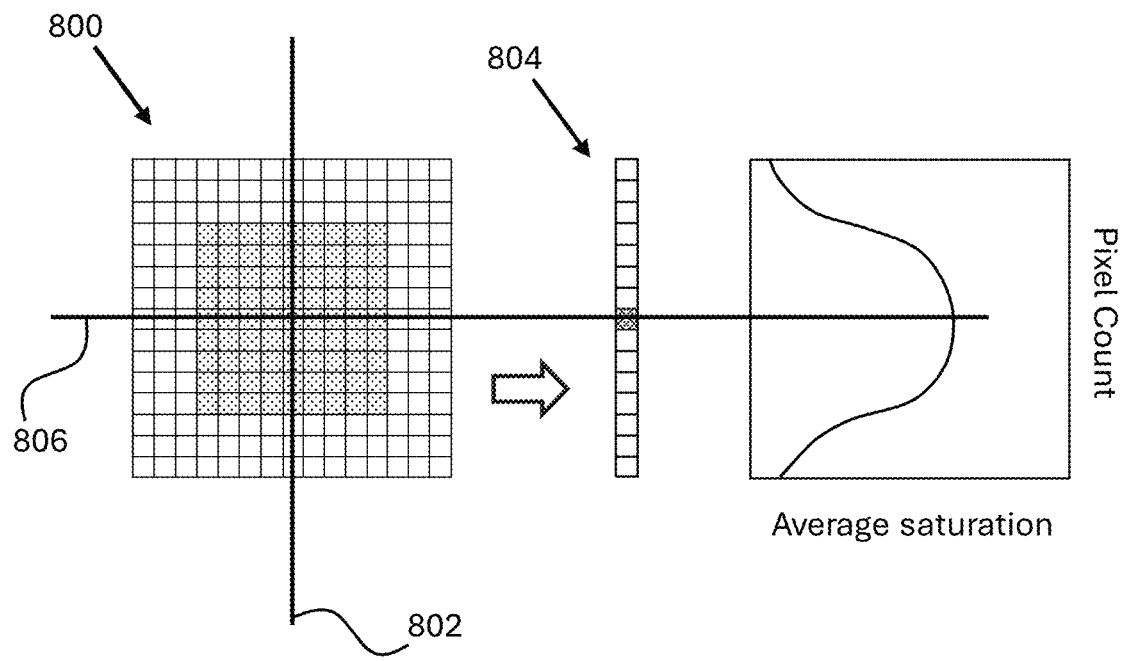
FIG. 9 illustrates a horizontal averaging of color saturation on the digital image for finding a location pixel of the colored region, according to some embodiments of the present invention.

In the example of FIG. 9, the digital image 800 is provided such that the colored region is substantially symmetrical about a vertical axis 802. For each pixel of the digital image, a color saturation value is determined. The color saturation values are averaged horizontally, thereby determining a plurality of average horizontal saturation values. Thus, an image having a resolution of 96×928 is converted into a one-dimensional vector 804 having a size of 1×928, where each element of the vector is the average of the saturations along the horizontal pixels of the 96×928 digital image. A peak is determined among the average horizontal saturation values. The vertical location 806 of the peak is set as the vertical coordinate of the location pixel of the colored region. The horizontal location of the vertical axis 802 is a horizontal coordinate of the colored region.

Figure 12:
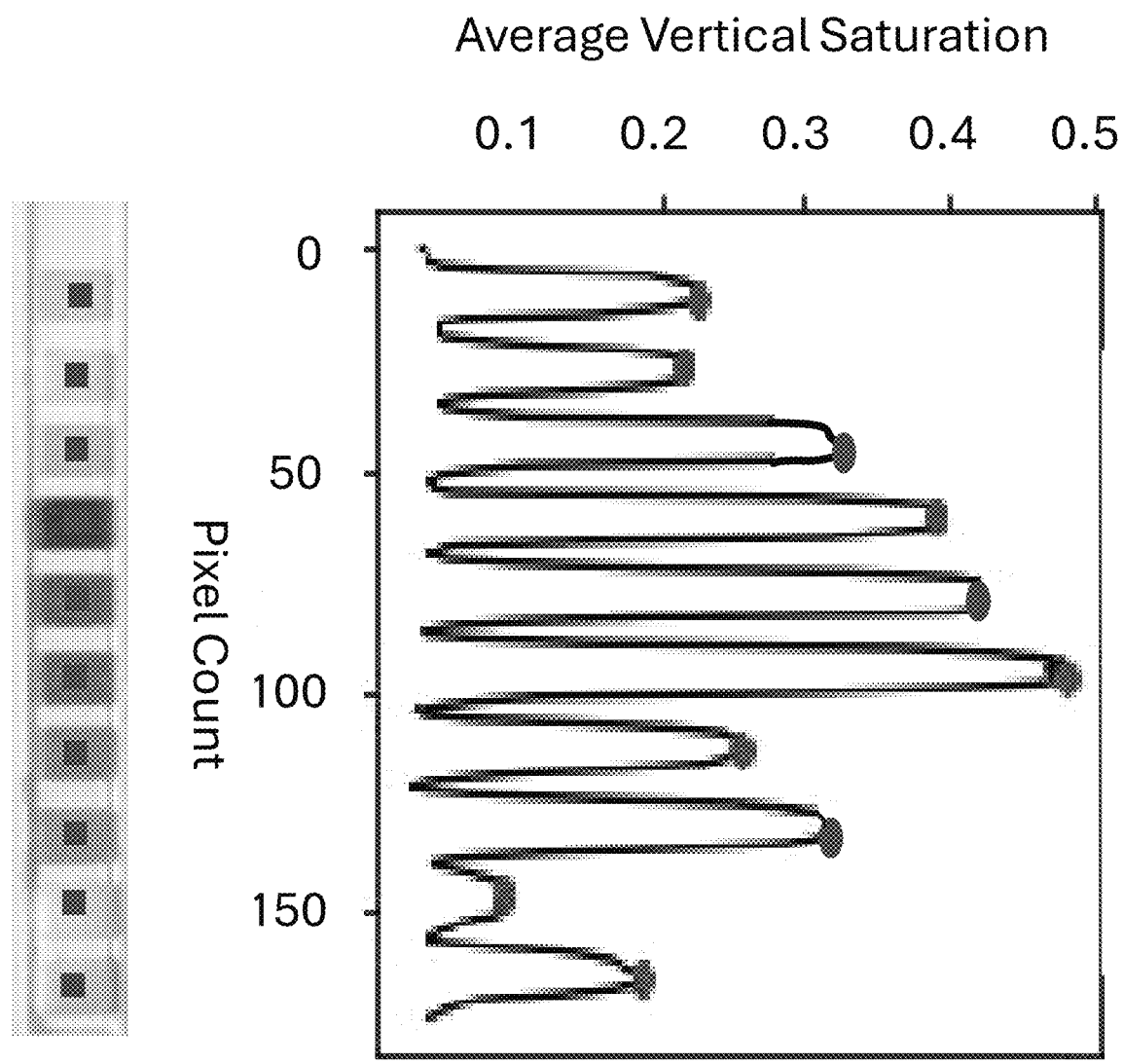
FIG. 12 illustrates a horizontal averaging of color saturation on the digital image for finding location pixels of a plurality of colored regions on a test strip, according to some embodiments of the present invention.

This technique is advantageous for a test strip which has a plurality of reagent pads disposed along a column and separated by a white background. By using this technique, the location pixels of all the reagent pads are determined at once, by locating peaks in the horizontal average saturation. This is shown in FIG. 12. Each peak corresponds to a substantially central location of a respective reagent pad. A Siemens test strip has ten analytes, therefore, ten peaks are found by analyzing a Siemens test strip. Different test strips may have a different number of analytes producing a corresponding number of peaks.

Figure 13:
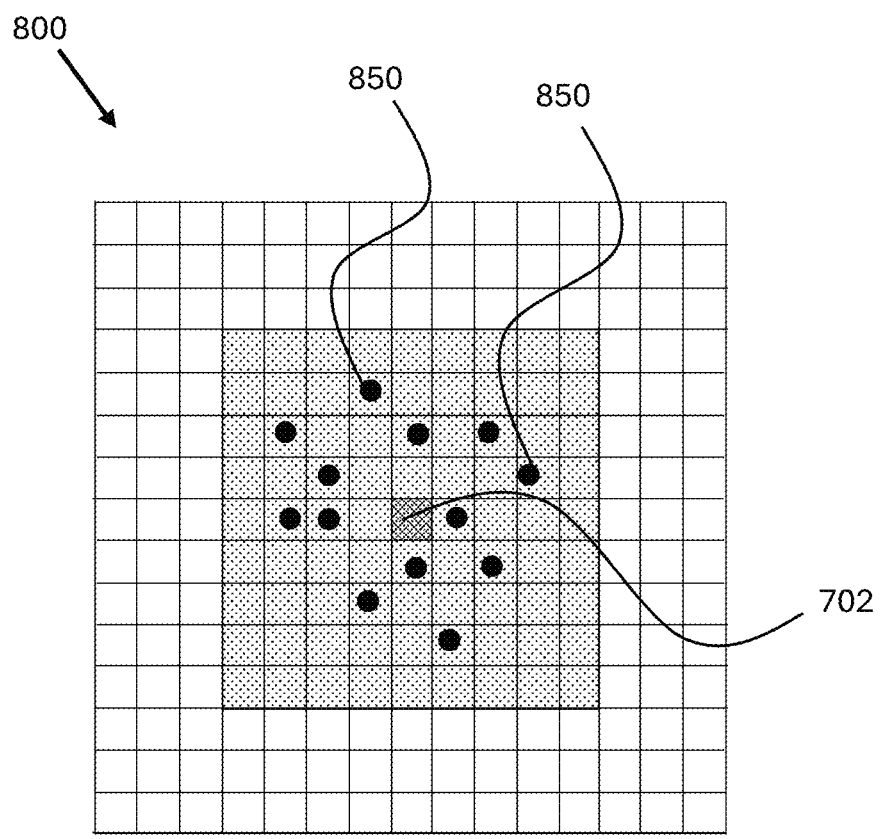
FIG. 13 illustrates a plurality of positions used to determine average values of color components in a colored region, according to some embodiments of the present invention.

FIG. 13 illustrates a plurality of positions used to determine average values of color components in a colored region, according to some embodiments of the present invention In some embodiments of the present invention, a plurality of positions 850 is provided in the colored region. For each position of the plurality of positions, a respective set of second values of the color components belonging to the predetermined color space is determined. For each color component, the second values of the positions are averaged. Therefore, a set of average values of the color components is calculated. The set represents the color of the colored region.

For example, using the RGB color space, within the colored region, a plurality of positions 850 are provided, each position being indicated with a respective index i and having a color $V_i$ $$V_i = [R_i, G_i, B_i]$$

$R_i$ is the value of the red component at the respective position; $G_i$ is the value of the green component at the respective position; $B_i$ is the value of the blue component at the respective position.

The color V of the colored region is calculated by averaging each component separately over N positions:

$$V = \left[ \frac{\sum_{i=1}^{N} R_i}{N}, \frac{\sum_{i=1}^{N} G_i}{N}, \frac{\sum_{i=1}^{N} B_i}{N} \right]$$

In some embodiments, the positions 850 are located within a predetermined distance from the location pixel 702. The positions may determined randomly, or according to a desired distribution around the location pixel 702. A non-limiting number of pixels may be 100, but other numbers may be selected.

Figure 2:
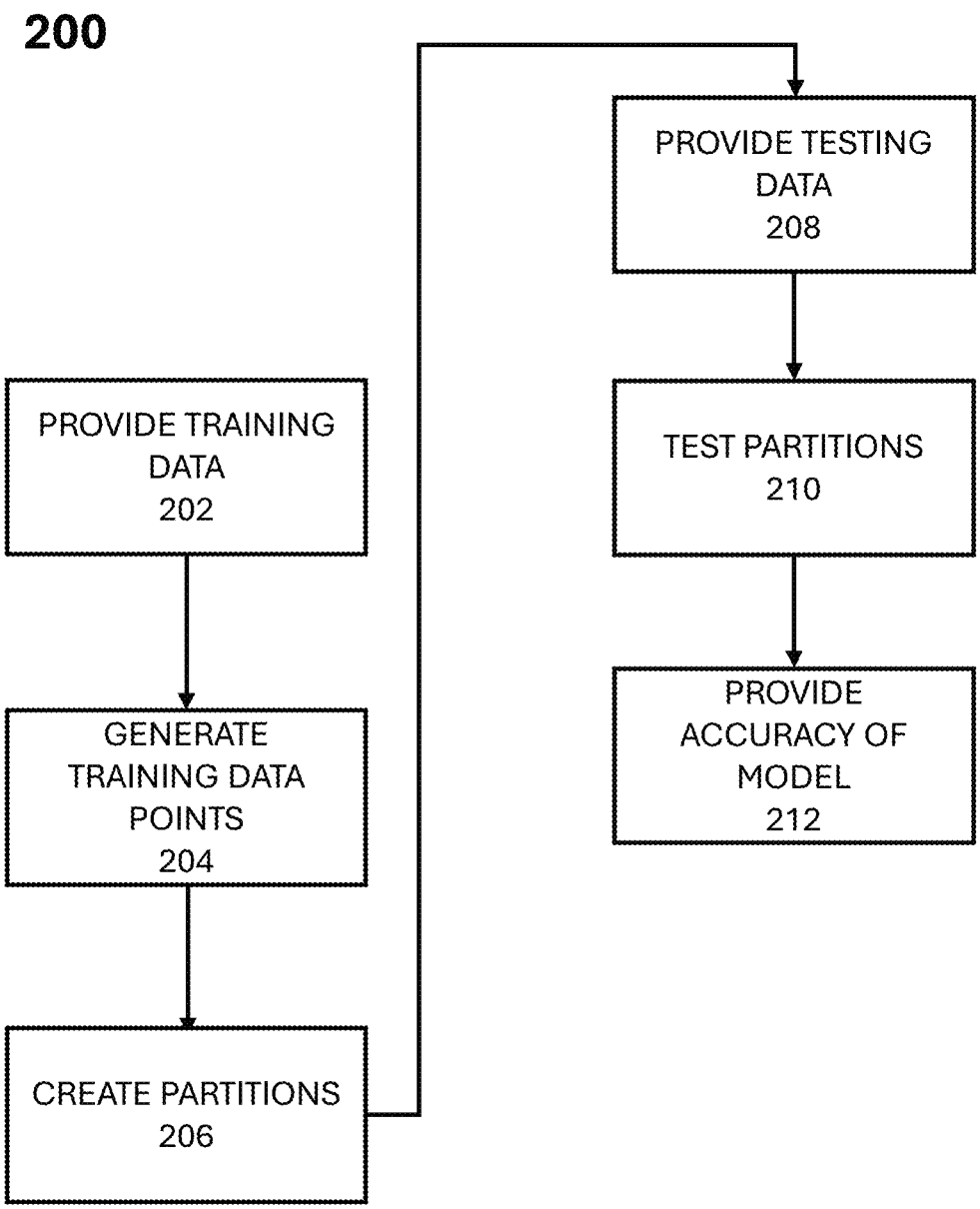
FIG. 2 is a flowchart illustrating a method for training a machine learning system to associate the color of a colored region with one discrete color of a predetermined plurality of discrete colors, according to some embodiments of the present invention.

FIG. 2 is a flowchart 200 illustrating a method for training a machine learning system to associate the color of a colored region with one discrete color of a predetermined plurality of discrete colors, according to some embodiments of the present invention.

At 202, training data is provided in the form of a plurality of first digital images having respective first colored regions having respective first colors. Each digital image is associated a priori with a known discrete color from the plurality of predetermined discrete colors. For example, if the digital image is the image of a reagent pad after contacting a liquid, the reagent pad is analyzed by a medical professional or by appropriate medical equipment, and the color of the reagent pad is associated with the closest color in the analyte chart (for the type of reagent pad). The digital image of a reagent pad in the training data includes metadata associating the digital image to one of predetermined discrete colors in the analyte chart that can be assumed by the regent pad.

At 204, training data points are generated. Each training data point corresponds to a point in the predetermined color space. In this manner, a plurality of points in the color space are generated, each point being associated with one of the predetermined discrete colors.

At 206, the machine learning system is instructed to identify clusters of the training data points in the color space and to create partitions between the clusters, taking into account the locations (in the color space) of the training data points and the discrete color associated with each of the training data points. In this manner, each cluster is associated to a respective color of the predetermined discrete colors. It should be clarified that the values of the predetermined discrete colors in the color space are not used in the identifications of the clusters. Rather, arbitrary (but consistent) classifiers indicative of the predetermined discrete colors (but not connected to physical properties of the predetermined color) allow the machine learning system to be trained to associate the identified clusters with the predetermined discrete colors. For each cluster, one or more parameters may be generated, indicative of the cluster.

At 208, testing data is provided in the same form as the training data. Preferably, none of the images of the training data are included in the testing data. In this manner, the partitioning can be tested with data that was not used to generate the partitioning.

At 210, the partitioning is tested using the testing data. As mentioned above, the testing data includes a color (represented as a vector of its components in the color space) and one of the discrete colors associated with it. If a testing data point fits into a color group associated with the same discrete color, the testing of the testing data point is considered successful. Otherwise, it is considered unsuccessful.

After using a certain number of testing data points, the accuracy of the partitioning is calculated as the ratio of the number of successful testing data points to the number of total testing data points. If the accuracy is above a desired level, the partitioning is kept and used for identifying a color of an input colored region. If not, the parameters indicative of the partitioning process are updated and training restarts with the new parameters.

In some embodiments of the present invention, the machine learning system includes a support vector machine (SVM). In the non-limiting application relating to the analysis of test strips, for each analyte present on the test strip, a custom support vector machine (SVM) is provided. A support vector machine is a machine-learning construct that attempts to numerically find the plane(s) that separate a scatter of data into different categories. Since this is a supervised learning scheme, its performance is directly dependent on the quantity and quality of data. A customized SVM structure first needs to be created in order to determine what kind of data is needed to analyze and create a diagnosis.

The first step is to select an input and an output for the SVM system. In a non-limiting example, the desired input for a SVM relating to a certain analyte is a Red-Green-Blue (RGB) color vector of the reagent pad corresponding to the analyte.

With the structure of the SVMs clearly defined, a suitable amount of RGB data is collected for each analyte to train the machines. In a non limiting example, 60 different test strips, all containing at least one abnormal reading (some level above negative for the given analyte), were chosen for the training dataset. In a non-limiting example, a set of half the size of the training set, i.e. 30 different test strips, is chosen for testing. Each sample in the testing set also possesses at least one abnormal reading.

For a training data set with M test strips, the overall training matrix $V_{TRAIN}$ for the same type of reagent pads (i.e. reagent pads reacting with the same analyte) is $$V_{TRAIN} = \begin{bmatrix} R_1 & G_1 & B_1 & y_1 \\ \vdots & \vdots & \vdots & \vdots \\ R_m & G_m & B_m & y_M \end{bmatrix}$$

Each data point $[R_j, G_j, B_j, y_j]$ (with j being an integer from 1 to M) corresponds to a reagent pad of a certain type in one of the images provided in the training data, and may be obtained by averaging the components at a plurality of positions in the colored region of reagent pad, as mentioned above with reference to determining the color of the input vector. $y_j$ is a classifier indicative of the known diagnosis for the reagent pad. In a non-limiting example, if the reagent pad is a Specific Gravity (SG in FIG. 10) pad, as seen in FIG. 10, the color relating to the 1.000 diagnosis is assigned a classifier y=0, the color relating to the 1.005 diagnosis is assigned a classifier y=1, the color relating to the 1.010 diagnosis is assigned a classifier y=2, the color relating to the 1.015 diagnosis is assigned a classifier y=3, the color relating to the 1.020 diagnosis is assigned a classifier y=4, the color relating to the 1.025 diagnosis is assigned a classifier y=5, and the color relating to the 1.030 diagnosis is assigned a classifier y=6. Therefore, a reading of the SG reagent pad in the image is made by a medical professional or by a customized machine, by comparing the color of the reagent pad to the discrete colors of Siemens Chart. If the color of the reagent pad is closest to the color in the Siemens chart relating to the 1.025 diagnosis, the y classifier assigned to the specific data point is 5. In the case of Bilirubin (BIL in FIG. 10), the color relating to the Negative diagnosis is assigned a classifier y=0, the color relating to the Small diagnosis is assigned a classifier y=4, the color relating to the Moderate diagnosis is assigned a classifier y=5, the color relating to the Large diagnosis is assigned a classifier y=6. The figures assumed by the classifiers may be selected differently.

The plurality of data points $[R_j, G_j, B_j]$ are separated into clusters according to positions thereof and the predetermined discrete color (diagnosis) associated therewith. The SVM produces a plurality of hyperplanes that separate discrete clusters of data that are naturally present in the training data.

Once an input vector is provided for a reagent pad, the output of the analysis of the input vector is the predicted diagnosis for the corresponding analyte. The diagnosis for an analyte is based on how the color of the analyte pad in the test strip fits any of a plurality of color groups that have been determined during training and corresponding to one of the diagnoses for that specific analyte. In other words, for each analyte, the processing of a particular analyte incudes receiving an average RGB value and returning a prediction on the level of that analyte present in the tested liquid.

In the example of the SVM, a matrix X is generated from the matrix $V_{TRAIN}$.

$$X = \begin{bmatrix} R_1 & G_1 & B_1 \\ \vdots & \vdots & \vdots \\ R_m & G_m & B_m \end{bmatrix}$$

$$X_j = [R_j, G_j B_j]$$

$X_j$ refers to a specific row in the training vector X.
w=support vector=$[w_R, w_G, w_B]$
b=plane offset (scalar)
r=learning rate
$\lambda_j$=multiplier The learning rate r is a hyperparameter that affects accuracy. Its role in the training process is to guide the speed of the algorithm. In a very general sense (with many exceptions) a larger learning rate leads to lower accuracy with faster convergence and a smaller learning rate leads to higher accuracy with slower convergence The multiplier $\lambda_j$ can be fixed during training or updated during training. In a non-limiting example, $\lambda_j$ is constant. In another non-limiting example, an algorithm for $\lambda_j$ exists such $\lambda_j$ that is updated for each row of the matrix X.

SVM operates in a binary manner, in that SVM can identify one cluster at a time. Once a first cluster has been identified, and a first support hyperplane has been found to separate the first cluster from all other data, the hyperparameters w and b relating to the first support hyperplane are recorded. Then, a second cluster is identified and a second hyperplane is found to separate the second cluster from all other clusters, except for the first cluster (which is already separated from the second cluster—and all other clusters—via the first hyperplane). The hyperparameters w and b relating to the second support hyperplane are recorded. This iterative process is repeated until (D-1) hyperplanes are found to separate D diagnosis levels.

Let's use bilirubin as an example. Initially, in order to identify the first cluster (corresponding to the negative diagnosis, as seen in FIG. 10), each $y_j$ are updated to $$y'_j,$$

so that where $y_j=0$ (negative diagnosis)

$$y'_j = -1,$$

and where $y_j \neq 0$ (all other diagnoses)

$$y'_j = +1.$$

Then, each $X_j$ is iterated through to update the support vector w according to the following condition:

$$y'_j(X_j \cdot w - b) \geq 1$$

If this condition returns TRUE, w and b are updated as:
$w \leftarrow w - 2r\lambda_j w$
$b \leftarrow 0$ However, if this condition returns FALSE, w and b are instead updated as:

$$w \leftarrow w - r(2\lambda_j w - Xy'_j)$$

$$b \leftarrow r - ry'_j$$

Once all $X_j$ vectors have been iterated though with w and b being updated at each iteration, $w_0$ and $b_0$ are found, which are the w and b corresponding to the hyperplane and support vector separating the cluster corresponding to negative diagnosis from a cluster comprising all the remaining data points (and optionally optimized to have maximal distance between the centers of the clusters). $w_0$ and $b_0$ are the parameters of such hyperplane and support vector.

Once the first hyperplane and support vector have been identified, we move onto the second cluster. In order to identify the second cluster (corresponding to the Small diagnosis), each $y_i$ are updated to $$y'_j,$$

so that where $y_j=4$ (Small diagnosis)

$$y'_j = -1,$$

and where $y_j \neq 4$ (all other diagnoses)

$$y'_j = +1.$$

Each row $X_j$ (except for the rows where $y_j=0$) is iterated through to update the support vector w according to the following condition:

$$y'_j(X_j \cdot w - b) \geq 1$$

If this condition returns TRUE, w and b are updated as:
$w \leftarrow w - 2r\lambda_j w$
$b \leftarrow 0$ However, if this condition returns FALSE, w and b are instead updated as:

$$w \leftarrow w - r(2\lambda_j w - Xy'_j)$$
$$b \leftarrow b - ry'_j$$

Once all $X_j$ vectors (except for the rows where $y_j=0$) have been iterated though with w and b being updated at each iteration, $w_4$ and $b_4$ are found, which are the w and b corresponding to the hyperplane and support vector separating the cluster corresponding to Small diagnosis from a cluster containing the remainer of the training data. $w_4$ and $b_4$ are the parameters of this hyperplane and support vector.

In the same manner, $w_5$ and $b_5$ are found by iterating through $X_j$ where $y_j=5$ and $y_j=6$ (and not through the vectors where $y_j=1$ and $y_j=0$), to define the hyperplane and support vector separating the cluster associated with the Moderate diagnosis from a cluster containing the remainer of the training data.

After a set number of iterations, three hyperplanes (and their corresponding support vectors) and four clusters are identified. A decision tree is constructed to perform a series of binary predictions to determine which cluster contains an input vector V. The equation used for each prediction is $$C = \text{sign}[V \cdot w_k - b_k]$$

where C is either +1 or −1, V is the input color expressed as a vector of color components, and $w_k$ and $b_k$ are the parameters of the $k^{th}$ hyperplane and support vector found above. For a given hyperplane and support vector having $w_k$ and $b_k$, if C=−1, it means that the input color is on the side of the hyperplane associated with the cluster that the hyperplane separates from all other clusters. If C=−1, the input color is on the other side of the hyperplane.

Figure 21:
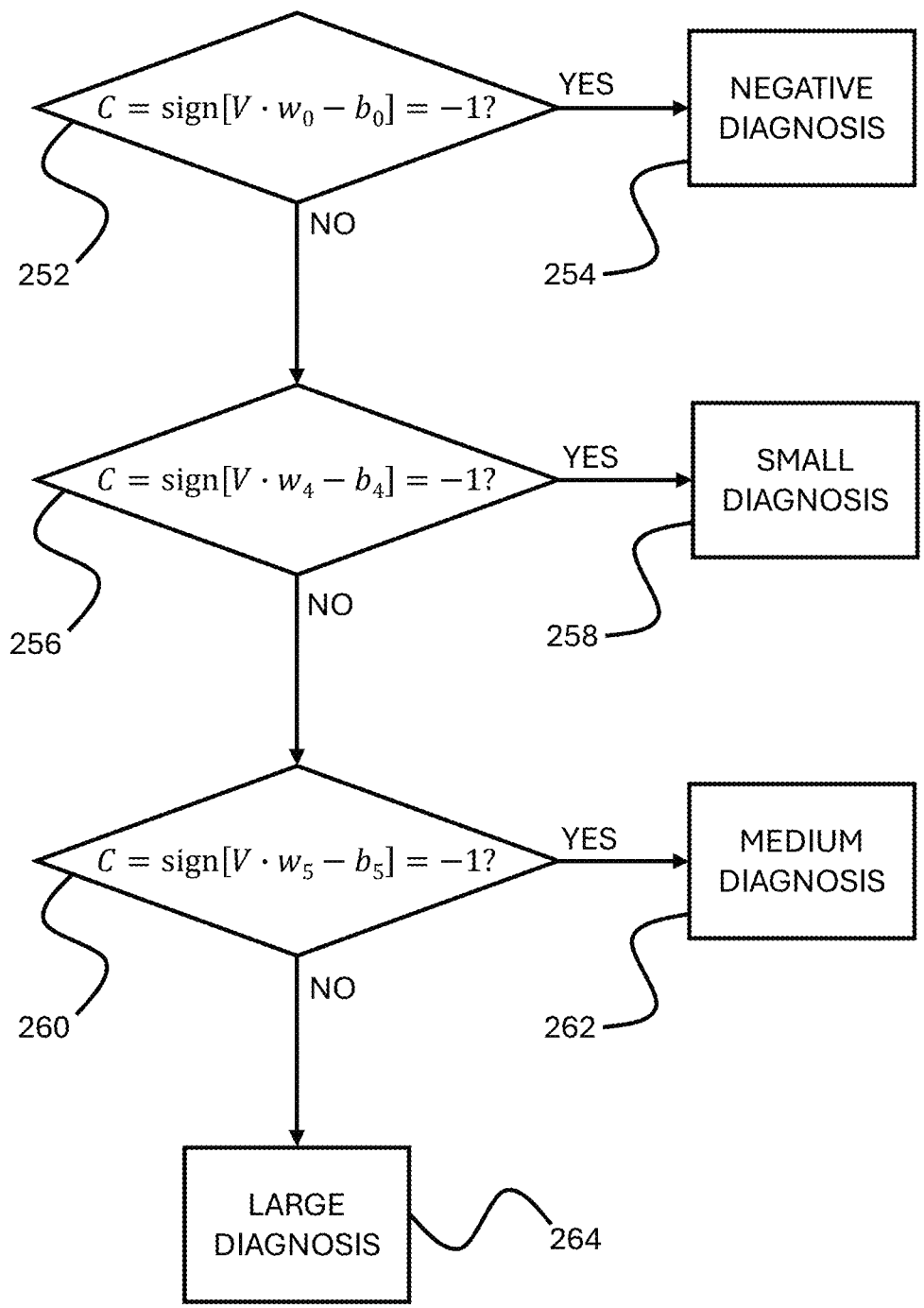
FIG. 21 is a flowchart for determining a diagnosis of an analyte based on the color of a reagent pad, according to some embodiments of the present invention.

An example of a decision tree 250 is shown in FIG. 21. The decision tree relates to bilirubin readings. Decision trees for other analytes or for other purposes may be constructed in the same manner.

At 252, the first hyperplane having parameters $w_0$ and $b_0$ is used, and C is calculated for the input color. A query is made to determine whether C=−1. If C=−1, then a Negative diagnosis is determined at 254. If, on the other hand, C=+1, analysis proceeds to the next branch of the decision tree at 256.

At 256, the second hyperplane having parameters $w_4$ and $b_4$ is used, and C is calculated for the input color. A query is made to determine whether C=−1. If C=−1, then a Small diagnosis is determined at 258. If, on the other hand, C=+1, analysis proceeds to the next branch of the decision tree at 260.

At 260, the third hyperplane having parameters $w_5$ and $b_5$ is used, and C is calculated for the input color. A query is made to determine whether C=−1. If C=−1, then a Medium diagnosis is determined at 262. If, on the other hand, C=+1, a Large diagnosis is determined at 264.

Similar decision trees with respective number of steps can be built for different analytes.

Figure 3:
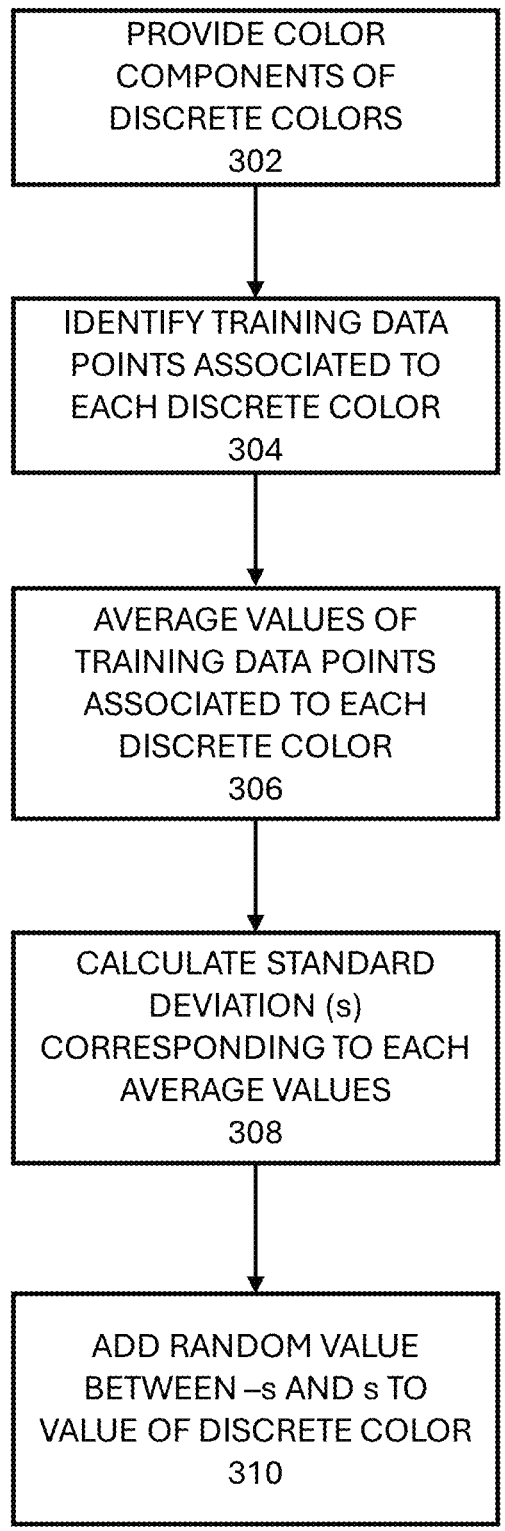
FIG. 3 is a flowchart a method for augmenting training data for training a machine learning system, according to some embodiments of the present invention.

FIG. 3 is a flowchart 300 a method for augmenting training data for training a machine learning system, according to some embodiments of the present invention.

Since there is a limited amount of data for training, it is advantageous to augment the training data with pseudo-samples from another source to prevent under-training or the creation of incomplete models (e.g. a model incapable of predicting a certain discrete color (which may be indicative of a certain analyte level, if the technique of the present patent applications is applied to the analysis of test strips) because that discrete color has not appeared in the training set).

At 302, the color components of the predetermined discrete colors are provided.

At 304, for each of the predetermined discrete colors, the training data points corresponding to the predetermined discrete color are identified. At 306, for each predetermined discrete color, the values of each of the color components of the identified training data points are averaged, thereby creating a set of averaged training color components. At 308, a standard deviation corresponding to the averaged training color components is calculated. Therefore, each of the predetermined discrete colors has a corresponding standard deviation.

At 310, a pseudo training data point for each of the predetermined discrete colors is generated. This is done by adding to each one of the predetermined color component values a random number ranging from a negative value of the standard deviation to a positive value of the standard deviation corresponding to a respective average training value.

Applying this augmentation to the non-limiting example of test strip color recognition, the RGB value for each diagnosis level for a certain analyte is identified from the Siemens Chart. To each of the RGB values of a certain diagnosis of a certain analyte from the Siemens Chart, a random value no greater than the standard deviation (corresponding to the average of all training data points corresponding to the certain diagnosis of the certain analyte) is added or subtracted. In more mathematical terms, $$R_{pseudo} = R_{chart} + \text{random}[-s_r, s_r]$$

$$G_{pseudo} = G_{chart} + \text{random}[-s_G, s_g]$$

$$B_{pseudo} = B_{chart} + \text{random}[-s_b, s_b]$$

The newly-generated point [$R_{pseudo}$, $G_{pseudo}$, $B_{pseudo}$] is an augmented data point for a certain diagnosis of a certain analyte. Each analyte has a respective number of augmented data points, corresponding to the number of predetermined diagnoses. For example, looking at FIG. 9, the analyte PRO (Protein) has six predetermined diagnoses. Therefore, six augmented data points are added to the training data, one for each predetermined color corresponding to a respective diagnosis.

The weight of the augmentation is a number that refers to the augmented data points added for each diagnosis. For example, referring to PRO, for a weight of 1, six augmented data points are added (one for each diagnosis level). For weight of 2, twelve augmented data points are added (two for each of the six diagnosis levels). For weight of 3, eighteen augmented data points are added (three for each of the six diagnosis levels).

All augmented data points then form part of the training set for the given analyte.

The training data set is defined as the set of RGB vectors that have been extracted from test strips. The rows of this matrix each define a unique training data point while the columns represent the Red, Green, and Blue components of the unique point respectively. To formulate this mathematically, for a training data set with M test strips, the overall training matrix $V_{TRAIN}$ for the same type of reagent pads (i.e. reagent pads reacting with the same analyte) is $$V_{TRAIN} = \begin{bmatrix} R_1 & G_1 & B_1 & y_1 \\ \vdots & \vdots & \vdots & \vdots \\ R_m & G_m & B_m & y_M \end{bmatrix}$$

It should be noted that a unique $V_{TRAIN}$ matrix exists for each of the analytes. These matrices are kept separate to train the individual SVMs.

From here, the goal of the data augmentation is to generate a number additional unique points to add to the training set. The pseudo-data is generated to behave similarly to the actual data. To accomplish this, a given analyte is examined. For each new pseudo-point, the corresponding analyte and diagnosis level is looked up on the Analyte Chart.

The RGB value for this analyte/diagnosis level combination is pulled from the Analyte Chart and a random value no greater than the standard deviation of the sample data for that particular analyte and diagnosis level is randomly added or subtracted to this base value. In different terms a newly generated pseudo-point for a particular analyte a particular diagnosis level follows the form:

$$V_{NEW} = (\,) + (\,)$$

In this case, $s_r$, $s_g$, and $s_b$ are the standard deviations in the existing training data for the Red, Green, and Blue color components, respectively, for a specific analyte and diagnosis level.

After generating the requisite x points, the overall training data set looks like:

$$V_{TRAIN,AUGMENTED} = (\,)$$

It should be noted that the number x is the product of the weight number and the number of possible diagnoses for a certain analyte.

Figure 14:
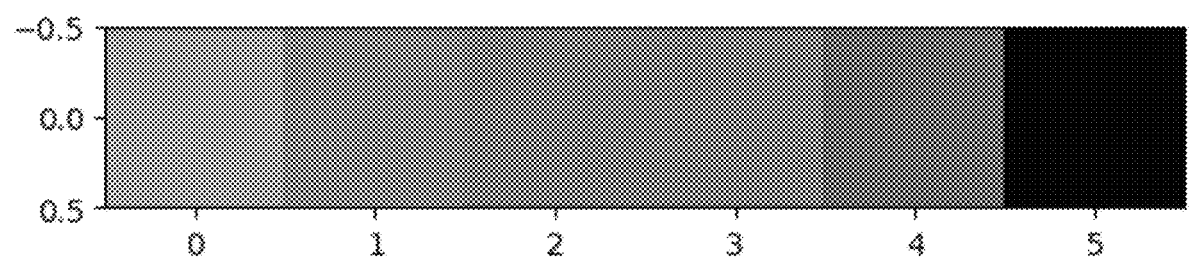
FIG. 14 illustrates a set of colors corresponding to different diagnoses of the protein reagent pad, yielded by using sparse training data, according to some embodiments of the present invention.

Augmenting the data set primarily serves to expand the training data and stabilize the global average of all color components (i.e. the average, Red, Green, and Blue colors for all data points) such that they are more distinct. If one considers the training set for protein, for example, it will be found that the colors are somewhat difficult to distinguish as a result of environmental conditions, the moisture content of the strip at the time of taking the picture, and the specific response of the chemicals in the test strip to that particular person's urine. Averaging together the data points for the different diagnoses in the training set for protein (before augmentation) yields the colors for each diagnosis level as shown in FIG. 14.

Moreover, it should also be noted that there is a hole for the diagnoses level "2000 or more" because of a lack of training data available for this analyte. While it is certainly possible to use just this to train an SVM, more accurate results (determined via quantitative testing of various methods) can be obtained by augmenting the training data for this analyte. The goals for this example are to: fill the hole left by the incomplete training set and bring the colors closer to the Siemens' Analyte chart for better diagnosis results.

In a non-limiting example, protein training data is augmented by weight=5. This means that 5 new training data points for each diagnosis are generated according to the scheme outlined above, yielding 30 data points (5 data points for each of the 6 diagnoses). After augmenting and averaging together the original training RGB values with the augmented training RGB values, the colors seen by the SVM for each diagnosis level for protein appear as shown in FIG. 15.

Figure 15:
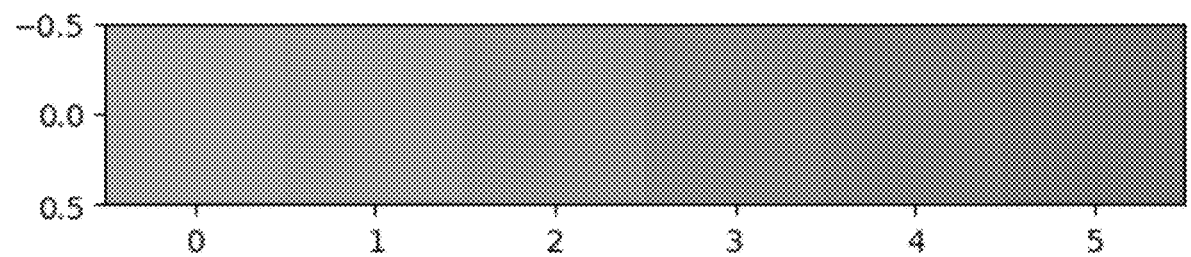
FIG. 15 illustrates a set of colors corresponding to different diagnoses of the protein reagent pad, yielded by using augmented training data, according to some embodiments of the present invention.

The colors of FIG. 15 are much closer to the colors found on the Siemens' Analyte Chart but still capture the fluctuations in the environmental conditions. The data augmentation is a critical component to achieving desired results and accuracy.

The use of machine learning techniques for training a machine learning system via a plurality of images of colored regions taken in different environmental conditions (such as lighting conditions) enables an accurate prediction on the predetermined color closest to the color of the colored region of a digital image, while diminishing the effect of the environmental conditions impacting the photograph of the colored region. Therefore, a robust predictive model is generated, which takes into account some variability of environmental conditions which occur at the moment the photograph of the colored region is taken. The robustness of the technique of the present invention enables the prediction of the discrete color closest to the color of the colored region via an app-based system, which is easy to implement via widely available communication devices (e.g., smart phones, laptops which cameras, tablets, desktop computers, etc.) and does not require specialized equipment at the user's end for creating consistent lighting conditions prior to photographing the colored region.

Figure 4:
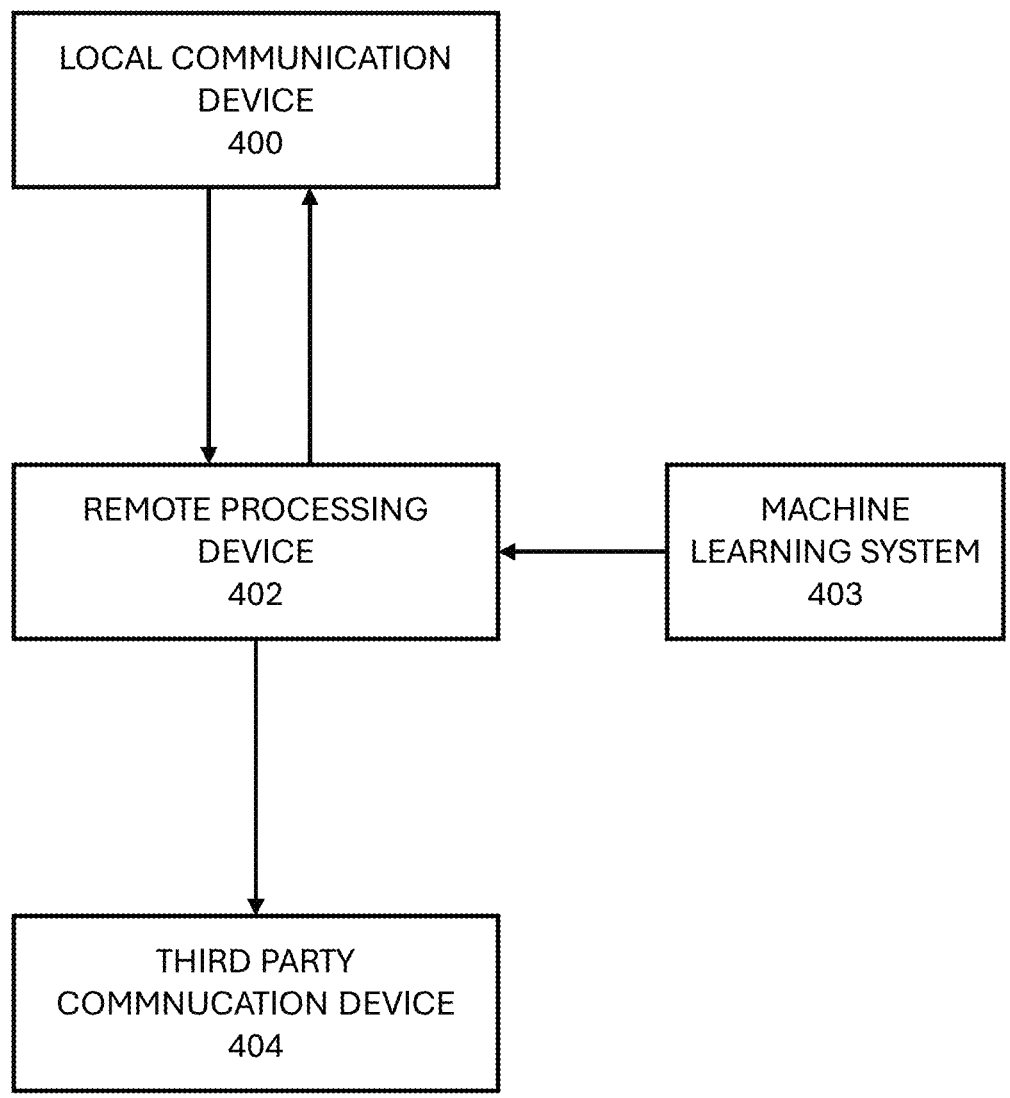
FIG. 4 is a diagram illustrating communication between a plurality of communication device for performing the method of FIG. 1, according to some embodiments of the present invention.
Figure 5:
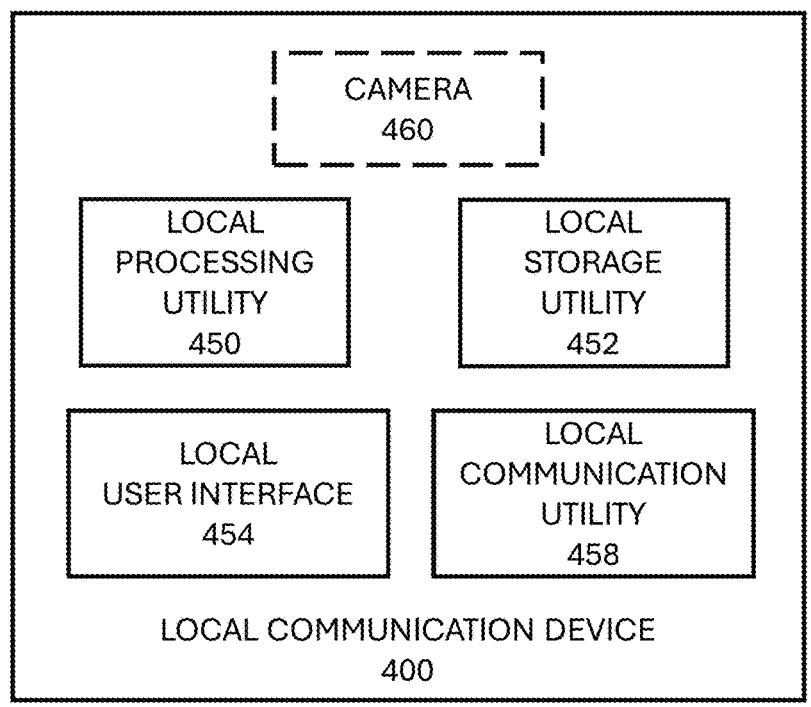
FIG. 5 is a block diagram illustrating a local communication device, according to some embodiments of the present invention.
Figure 6:
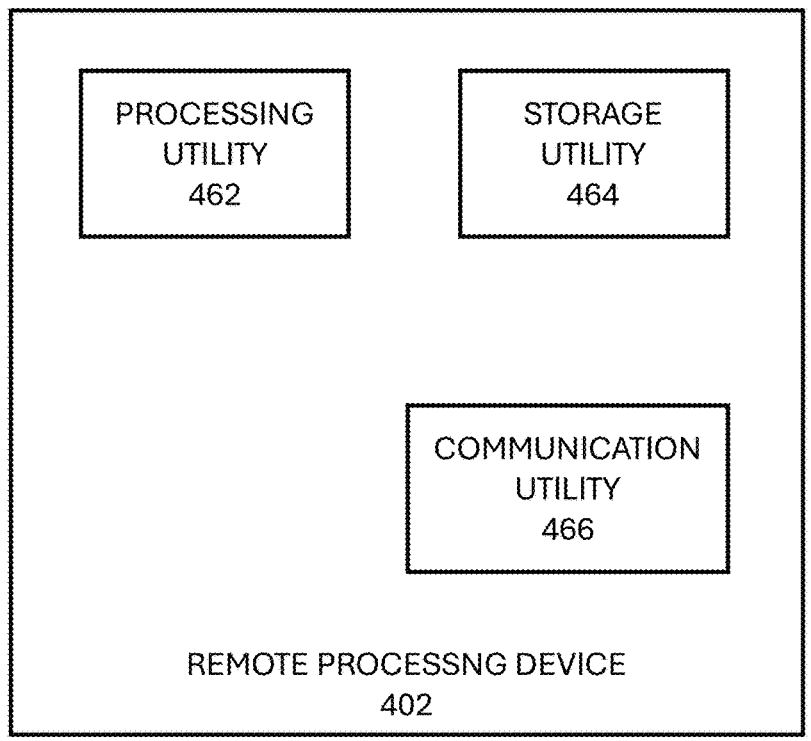
FIG. 6 is a block diagram illustrating a remote processing device, according to some embodiments of the present invention.
Figure 7:
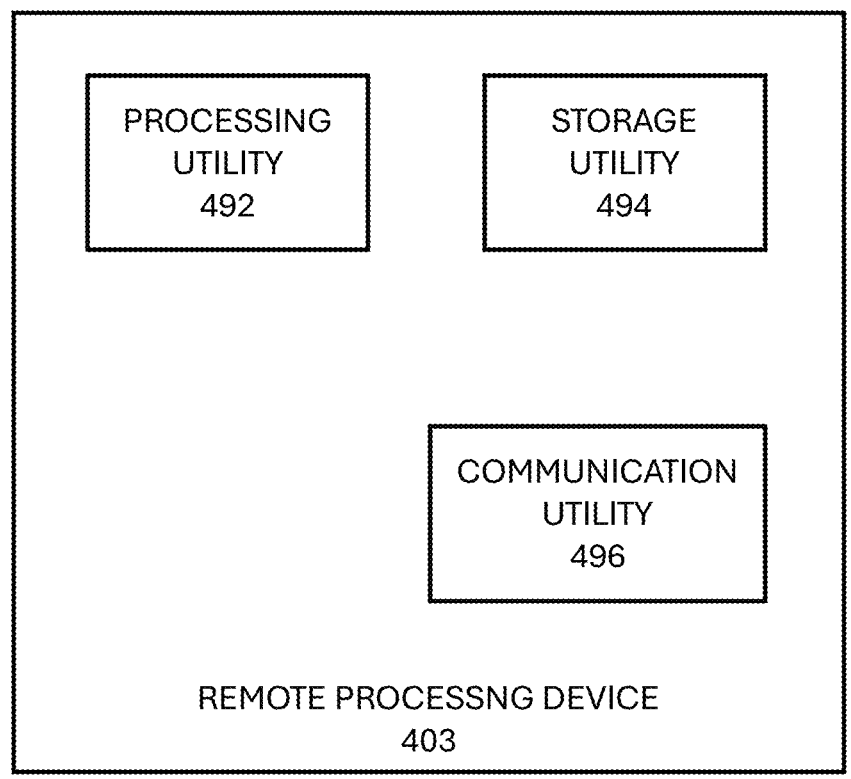
FIG. 7 is a block diagram illustrating a machine learning device, according to some embodiments of the present invention.

FIG. 4 is a diagram illustrating communication between a plurality of communication devices for performing the method of FIG. 1, according to some embodiments of the present invention. FIG. 5 is a block diagram illustrating a local communication device, according to some embodiments of the present invention. FIG. 6 is a block diagram illustrating a remote processing device, according to some embodiments of the present invention. FIG. 7 is a block diagram illustrating a machine learning device, according to some embodiments of the present invention In some embodiments of the present invention, the technique of the present invention is performed by a plurality of communication devices. For example, a local communication device 400 (smart phone, tablet, computer) is used to provide a digital image of an object with a colored region (e.g., a test strip).

The local communication device communicates with the remote processing device 402 via an application, and simply transfers the raw digital image to the remote processing device 402 for analysis. The processing of the digital image (resizing, and determining the color components of the colored region) is performed by the remote processing device 402, before determining the discrete color to which the color of the colored region corresponds.

The remote processing device 402 sends the output back to the local communication device 400. In some embodiments of the present invention, the remote processing device 402 also sends the output to a third party communication device 404 associated with the user of the local communication device. For example, going back to the use of the present invention to analyze a test strip, the local communication device 400 is associated with a patient. The patient urinates on the test strip and photographs the test strip via the local communication device or via a camera, the contents of which are transferred to the local communication device 400. The raw image of the test strip is sent to the remote processing device 402, where image processing occurs to determine the color of each reagent pad on the strip. The remote processing device 402 receives parameters relating to color groups (such as the parameters w and b of the support vectors separating the color groups, as discussed above) from a machine learning device 403 that was trained as mentioned above. The remote processing device 402 analyzes the test strip by using the parameters to process the colors of the reagent pads and outputs a diagnosis for each reagent pad by associating the color of each reagent pad to a respective set of discrete colors associated therewith (e.g., via the decision tree mentioned above). The diagnosis is sent back to the local communication unit, and may be also sent to the third party communication unit 404 of a medical professional associated with the patient, to inform the medical professional of the diagnoses, thereby allowing the medical professional to advise the patient remotely.

Therefore, the system of the present invention allows an application-based approach to enable remote analysis of a test strip and communication with a medical professional.

The local communication device 400 may include a local processing utility 450, a local storage utility 452, a user interface 454, and a local communication utility 458. The local communication device 400 may also include a camera 460. A "utility" includes hardware and/or software components. The local storage utility 452 includes non-volatile memory configured to store data and instructions to be processed by the local processing utility 450. The local storage utility stores machine readable media configured to be processed by the local processing utility to cause the local processing utility to provide a digital image of an object with a colored region to the machine learning device 402 via the local communication utility. In some embodiments of the present invention, the machine readable media also includes instructions that cause the local processing utility to activate the camera 460 (upon a command from the user interface 454) to capture a photograph of the object with a colored region. The user interface 454 is used for activating the local processing utility to use the machine readable media for photographing the object and/or for communication with the machine learning device 402.

The remote processing device 402 may be a remote server which includes a processing utility 462, a storage utility 464, and a communication utility 466. The storage utility is a non-volatile memory utility which stores machine readable instructions that cause the processing utility 462 to process a digital image and extract therefrom a color of the colored region and to process the extracted color with parameters received by the machine learning device, thereby associating the color of a colored region with one of a plurality of predetermined discrete colors. The communication utility 466 may be used for communication with the local communication device 400, with the machine learning device 403, with the third party communication device 404. The communication utility 466 may be used by an authorized user to update the machine readable instructions.

The machine learning device 403 may be a remote server which includes a processing utility 492, a storage utility 494, and a communication utility 496. The storage utility is a non-volatile memory utility which stores machine readable instructions that cause the processing utility 492 to train the machine learning system to identify color groups associated with respective predetermined discrete colors. The communication utility 496 may be used for communication with the remote processing device 402, to provide parameters indicative of the color groups. The communication utility 496 may be used by an authorized user to update the machine readable instructions and to provide training and testing data.

Figure 16:
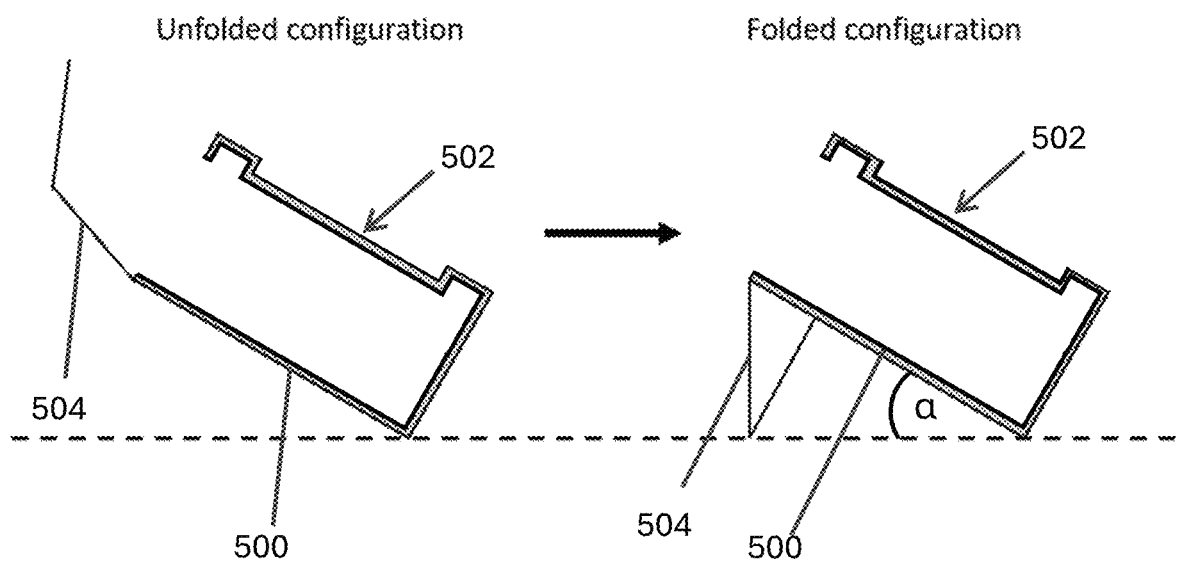
FIG. 16 is a side cross-sectional view of a recessed box for holding an object with a colored region, in an unfolded configuration and in a folded configuration, according to some embodiments of the present invention.
Figure 17:
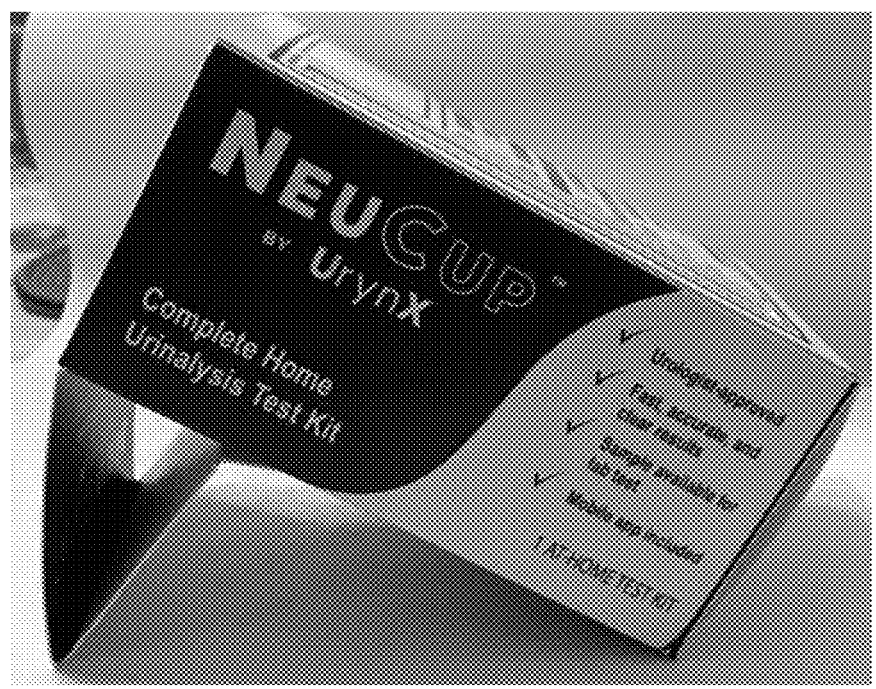
FIG. 17 is a photograph of the box of FIG. 16, according to some embodiments of the present invention.

FIG. 16 is a side cross-sectional view of a recessed box for holding an object with a colored regio, in an unfolded configuration and in a folded configuration, according to some embodiments of the present invention. FIG. 17 is a photograph of the box of FIG. 18, according to some embodiments of the present invention. FIG. 18 is a photograph of the recessed surface of the box of FIG. 16, according to some embodiments of the present invention. FIG. 19 is a photograph of a test strip taken when the box is not angled, according to some embodiments of the present invention. FIG. 20 is a photograph of a test strip taken when the box is set up at an angle with the horizontal, according to some embodiments of the present invention.

An important consideration when designing the system and method of the present invention relates to the effect environmental conditions, such as lighting and the orientation of the object with a colored region, on the accuracy of the application. From testing by the inventors, it is evident that environmental conditions have a significant impact on the overall efficacy of a predictive model.

To combat this, the present invention provides a machine learning technique to create a predictive model which diminishes the impact of environmental conditions which affect the input image, as mentioned above. Furthermore, in some embodiments of the present invention, a retail box 500 is provided to further mitigate the impact of the environmental effects. The retail box may contain a test strip, urine cup, and other key product components. The box possesses a recess 502 in the shape of the test strip for placing the test strip. Additionally, when the closure panel 504 of the box is folded outward, the box forms a stand that holds the strip and is inclined at a natural angle to reduce glare and shadows from the user and the cell phone taking the picture of the strip. The angle α may be between 25 degrees and 70 degrees, for example 35 degrees.

Note that the test strip rests in the recess 502 on the angled side of the box. Angling the box in this manner reduces the effects of shadows from the user and the user's phone while taking the picture since most light sources will be incident from directly overhead the user and the box. FIG. 19 is a picture of the test strip on the angle box, while FIG. 20 is a picture of the test strip when the box is not angle. FIG. 20 shows the improvements made by angling the test strip before the user takes the picture.

While it may appear subtle, the image of FIG. 19 (which was not taken at an angle) has a much more dramatic lighting gradient over the strip than the image of FIG. 20. Additionally, the image of FIG. 19 is much darker than the image of FIG. 20, meaning the true colors of the analytes will be slightly different in code. Image analysis algorithms are very sensitive to minor Red-Green-Blue (RGB) value differences, so it is important to create conditions in which lighting effects are mitigated.

In some embodiments of the present invention, the box 500 has a line 506 (which may be red) surrounding the recess 502. Once a photograph of the test strip is taken, the image of test strip is segmented from the remainder of the image by detecting the line 506 surrounding the indentation where the test strip is placed, and retaining only a section of the initial photograph that is within the line surrounding the recessed 502. In this manner the image is provided for the analysis described above.

What is claimed is:

1. A method for comparing a color of a colored region to a plurality of predetermined discrete colors, the method comprising:
   a) identifying, on a digital image, a colored region;
   b) determining a color of the colored region, and determining a set of first values of color components forming the color, the color components belonging to a predetermined color space;
   c) receiving parameters from a machine learning system trained to identify a plurality of color groups based on training data, and each color group corresponding to a respective discrete color of a plurality of predetermined discrete colors, the parameters being indicative of the color groups; and
   d) processing the first values with at least some of the parameters in order to associate the color of the colored region with one of the predetermined discrete colors;
   wherein (b) determining a color of the colored region comprises:
   providing a plurality of positions in the colored region;
      determining, for each position of the plurality of positions, a respective set of second values of the color components belonging to the predetermined color space; and
      averaging the second values of each color component of the plurality of positions, to yield a set of average values of the color components, the set of average values of the color components being the set of first values of color components of the color of the colored region.

2. The method of claim 1, wherein (a) providing, on a digital image, a colored region comprises:
   providing a location pixel indicative of a location of the colored region.

3. The method of claim 1, wherein the predetermined color space is an RGB color space, and the color components are a red color component, a green color component, and a blue color component.

4. The method of claim 1, comprising, prior to step (a):
   placing a test strip having the colored region on a recessed surface surrounded by a line;
   providing a raw digital image of the test strip in the recessed surface;
   detecting the line;
   obtaining the digital image by processing the raw digital image, by keeping from the raw digital image of the test strip in the recessed surface only a section that is within the line surrounding the recessed surface.

5. The method of claim 1, comprising, prior to step (a):
   placing a test strip having the colored region on a surface;
   tilting the surface with respect to a horizontal plane;
   capturing a photograph of the test strip while tilted;
   processing the photograph to provide the digital image.

6. A method for training a machine learning system to generate the plurality of color groups, the method comprising:
   providing training data in form of a plurality of first digital images having respective first colored regions having respective first colors and providing a known discrete color of the plurality of predetermined discrete colors for each first color;
   generating training data points for a plurality of colors assumed by the first colored regions by using the first digital images, each training data point corresponding to a point in a predetermined color space;
   instructing the machine learning system to detect clusters of the training data points and to create partitions between the clusters; and
   outputting parameters of the partitions;
   wherein each training data point corresponds to a respective first colored region of a respective first digital image, and each training point being determined by detecting a training value of each of the color components belonging to the predetermined color space in the first colored region.

7. The method of claim 6, wherein each the training value is calculated by:
   detecting first-region values of the color components belonging to the predetermined color space at a plurality of spots in the respective first colored region;
   for each of the color components averaging the first-region values of the spots, thereby generating the training value of each color of the components.

8. A method for analysis of a digital image of one or more reagent pads on a test strip, each of the one or more reagent pads being configured to assume one of a respective plurality of colors upon contacting a liquid, depending on a quantity of a substance in the liquid, the method comprising:
   a) providing, on a digital image of a test strip, a set of location pixels, each location pixel indicative of a location of a respective one of one or more reagent pads of the test strip;
   b) determining, for a plurality of positions around the location pixel of each of the one or more reagent pads, values of color components belonging to a predetermined color space;
   c) for each one of the one or more reagent pads, separately averaging the values of each of the color components at the positions, thereby generating an average input value for each of the color components and generating a color of the pad as a set comprising the average input values;

d) for each one of the one or more reagent pads, providing a respective set of parameters from a machine learning system trained to identify a plurality of color groups which correspond to respective diagnoses for a substance reacting with the one of the reagent pad, the parameters being indicative of the color groups;

e) for each one of the one or more reagent pads, processing the average input values of the color components of the reagent pad with at least some of the parameters indicative of the color groups associated with the reagent pad, to determine which of the color groups the color of the reagent pad fits into, thereby associating the color of the reagent pad with a diagnosis of the one of color groups corresponding the reagent pad, and outputting a diagnosis relating to the substance reacting with the one of the one or more reagent pads.

9. A method for comparing a color of a colored region to a plurality of predetermined discrete colors, the method comprising:
   a) identifying, on a digital image, a colored region;
   b) determining a color of the colored region, and determining a set of first values of color components forming the color, the color components belonging to a predetermined color space;
   c) receiving parameters from a machine learning system trained to identify a plurality of color groups based on training data, and each color group corresponding to a respective discrete color of a plurality of predetermined discrete colors, the parameters being indicative of the color groups; and
   d) processing the first values with at least some of the parameters in order to associate the color of the colored region with one of the predetermined discrete colors;
   wherein (a) providing, on a digital image, a colored region comprises providing a location pixel indicative of a location of the colored region; and
   wherein (b) determining a color of the colored region comprises:
      providing a plurality of positions within a predetermined distance from the location pixel;
      determining, for each position in the plurality of positions, a respective set of second values of the color components belonging to the predetermined color space; and
      averaging the second values of each color component of the plurality of positions, to yield a set of average values of the color components, the set of average values of the color components being the set of first values of color components of the color of the colored region.

10. A method for comparing a color of a colored region to a plurality of predetermined discrete colors, the method comprising:
    a) identifying, on a digital image, a colored region;
    b) determining a color of the colored region, and determining a set of first values of color components forming the color, the color components belonging to a predetermined color space;
    c) receiving parameters from a machine learning system trained to identify a plurality of color groups based on training data, and each color group corresponding to a respective discrete color of a plurality of predetermined discrete colors, the parameters being indicative of the color groups; and
    d) processing the first values with at least some of the parameters in order to associate the color of the colored region with one of the predetermined discrete colors;
    wherein (a) providing, on a digital image, a colored region comprises providing a location pixel indicative of a location of the colored region by:
       resizing the digital image to generate a resized image of a predetermined pixel size;
       determining, for each pixel of the resized image, a color saturation value;
       finding a peak saturation value among the color saturation values, the peak corresponding to the location of the colored region;
       setting a location corresponding to the peak saturation value as the location pixel of the colored region.

11. A method for comparing a color of a colored region to a plurality of predetermined discrete colors, the method comprising:
    a) identifying, on a digital image, a colored region;
    b) determining a color of the colored region, and determining a set of first values of color components forming the color, the color components belonging to a predetermined color space;
    c) receiving parameters from a machine learning system trained to identify a plurality of color groups based on training data, and each color group corresponding to a respective discrete color of a plurality of predetermined discrete colors, the parameters being indicative of the color groups; and
    d) processing the first values with at least some of the parameters in order to associate the color of the colored region with one of the predetermined discrete colors;
    wherein the digital image is provided such that the colored region is substantially symmetrical about a vertical axis;
    wherein (a) providing, on a digital image, a colored region comprises providing a location pixel indicative of a location of the colored region by:
       resizing the digital image to generate a resized image of a predetermined pixel size;
       determining, for each pixel of the resized image, a color saturation value;
       averaging the color saturation values horizontally, thereby determining a plurality of average horizontal saturation values;
       finding a peak among the average horizontal saturation values;
       setting a vertical location of the peak as a vertical coordinate of the location pixel of the colored region;
       setting a horizontal location of the vertical axis as a horizontal coordinate of the colored region.

12. A method for comparing a color of a colored region to a plurality of predetermined discrete colors, the method comprising:
    a) identifying, on a digital image, a colored region;
    b) determining a color of the colored region, and determining a set of first values of color components forming the color, the color components belonging to a predetermined color space;
    c) receiving parameters from a machine learning system trained to identify a plurality of color groups based on training data, and each color group corresponding to a respective discrete color of a plurality of predetermined discrete colors, the parameters being indicative of the color groups; and d) processing the first values with at least some of the parameters in order to associate the color of the colored region with one of the predetermined discrete colors;
wherein:
step (a) comprises: identifying, on the digital image, a plurality of separate colored regions, each colored region being surrounded by a background region;
step (b) comprises: for each colored region, determining a respective color of the colored region, and determining a respective set of first values of color components forming the respective color, the color components belonging to the predetermined color space;
step (c) comprises: for each colored region, receiving a respective set of parameters from a machine learning system trained to generate a set of color groups, each set of color groups being associated with a respective colored region of the plurality of colored regions, each color group corresponding to a respective discrete color of a respective plurality of predetermined discrete colors associated with the colored region, the parameters in each set of parameters being indicative of the color groups; and
step (d) comprises: for each colored region, processing the first values with at least some of the parameters indicative of the color groups associated with the colored region, in order to associate the color of the colored region with one the predetermined discrete colors.

13. A method for comparing a color of a colored region to a plurality of predetermined discrete colors, the method comprising:
a) identifying, on a digital image, a colored region;
b) determining a color of the colored region, and determining a set of first values of color components forming the color, the color components belonging to a predetermined color space;
c) receiving parameters from a machine learning system trained to identify a plurality of color groups based on training data, and each color group corresponding to a respective discrete color of a plurality of predetermined discrete colors, the parameters being indicative of the color groups; and
d) processing the first values with at least some of the parameters in order to associate the color of the colored region with one of the predetermined discrete colors;
wherein the method comprises, prior to step (a), training the machine learning system to generate the plurality of color groups, by:
providing training data in form of a plurality of first digital images having respective first colored regions having respective first colors and providing a known discrete color of the plurality of predetermined discrete colors for each first color;
generating training data points for a plurality of colors assumed by the first colored regions by using the first digital images, each training data point corresponding to a point in the predetermined color space;
instructing the machine learning system to create a predictive model by identifying clusters of the training data points in the color space, using locations of the points in the color space and the known discrete colors of the training data points, and creating partitions between the clusters;
wherein the parameters are parameters of the partitions separating the clusters.

14. The method of claim 13, wherein each training data point corresponds to a respective first colored region of a respective first digital image, and each training point being determined by:
detecting a training value of each of the color components belonging to the predetermined color space in first colored region.

15. The method of claim 14, wherein each training value is calculated by:
detecting first-region values of the color components belonging to the predetermined color space at a plurality of spots in the respective first colored region;
for each of the color components averaging the first-region values of the spots, thereby generating the training value of each color of the components.

16. The method of claim 13, wherein the machine learning system comprises a support vector machine (SVM).

17. The method of claim 13, wherein the generating of training data points further comprises augmenting the training data by creating one or more pseudo samples, the creating of one of the pseudo samples comprising:
providing the discrete colors of the plurality of predetermined discrete colors, and for each of the discrete colors providing a set of predetermined color component values which form the predetermined color in the color space;
for each of the predetermined discrete colors, identifying the training data points corresponding to the predetermined discrete color and averaging the training values of each of the color components of the identified training data points, thereby creating a set of averaged training color components, and calculating a standard deviation corresponding to each of the averaged training color components;
generating a pseudo training data point for each of the predetermined discrete colors, by adding to each one of the predetermined color component values a random number ranging from a negative value of the standard deviation to a positive value of the standard deviation corresponding to a respective average training color component.

18. A method for training a machine learning system to generate the plurality of color groups, the method comprising:
providing training data in form of a plurality of first digital images having respective first colored regions having respective first colors and providing a known discrete color of the plurality of predetermined discrete colors for each first color;
generating training data points for a plurality of colors assumed by the first colored regions by using the first digital images, each training data point corresponding to a point in a predetermined color space;
instructing the machine learning system to detect clusters of the training data points and to create partitions between the clusters;
outputting parameters of the partitions;
wherein the generating of the training data points further comprises augmenting the training data by creating one or more pseudo samples, the creating of one of the pseudo sample comprising:
providing the discrete colors of the plurality of predetermined discrete colors, and for each of the discrete colors providing a set of predetermined color component values which form the predetermined color in the color space;

for each of the predetermined discrete colors, identifying the training data points corresponding to the predetermined discrete color and averaging the training values of each of the color components of the identified training data points, thereby creating a set of averaged training color components, and calculating a standard deviation corresponding to the averaged training colored components;

generating a pseudo training data point for each of the predetermined discrete colors, by adding to each one of the predetermined color component values a random number ranging from a negative value of the standard deviation to a positive value of the standard deviation corresponding to a respective averaged training color component.

* * * * *